United States Patent [19]

Arfaei

[11] Patent Number: 4,814,014
[45] Date of Patent: Mar. 21, 1989

[54] HYDRAULIC CEMENT ADDITIVES AND HYDRAULIC CEMENT COMPOSITIONS CONTAINING SAME

[75] Inventor: Ahmad Arfaei, Milford, N.H.

[73] Assignee: W. R. Grace & Co., Cambridge, Mass.

[21] Appl. No.: 939,647

[22] Filed: Dec. 9, 1986

[51] Int. Cl.$^4$ .............................................. C04B 24/32
[52] U.S. Cl. ...................................... 106/90; 106/314; 106/315; 524/4; 524/5
[58] Field of Search .......................... 106/90, 314, 315; 524/4, 5

[56] References Cited

U.S. PATENT DOCUMENTS

| | | | |
|---|---|---|---|
| Re. 28,780 | 4/1976 | Bergmeister et al. | 260/856 |
| 3,862,265 | 1/1975 | Steinkamp et al. | 525/292 |
| 3,867,159 | 2/1975 | Ergene | 106/88 |
| 3,937,633 | 2/1976 | Knight, et al. | 106/90 |
| 4,229,224 | 10/1980 | Dawson et al. | 524/5 |
| 4,330,441 | 5/1982 | Bohmer et al. | 525/54.23 |
| 4,410,366 | 10/1983 | Birchall et al. | 106/90 |
| 4,676,317 | 6/1987 | Fry et al. | 523/130 |

FOREIGN PATENT DOCUMENTS 42-1035 1/1967 Japan .

OTHER PUBLICATIONS

V. I. Sinen'kaya, et al. "Effect of Polymer Additives on Composition and Properties of Cement Stone and Slurry", in Visn, L'viv. Politekh Inst., 149, 135-137 (1981).

*Primary Examiner*—William R. Dixon, Jr.
*Assistant Examiner*—David M. Brunsman
*Attorney, Agent, or Firm*—William L. Baker; John J. Wasatonic

[57] ABSTRACT

Hydraulic cement compositions are disclosed containing a hydraulic cement and a graft copolymer, the graft copolymer containing a polyether backbone and side chains prepared by polymerization of an ethylenically unsaturated monomers. The graft copolymer functions as a plasticizer in the cement composition.

33 Claims, No Drawings

HYDRAULIC CEMENT ADDITIVES AND HYDRAULIC CEMENT COMPOSITIONS CONTAINING SAME

The use of various additives to increase the fluidity of hydraulic cement compositions has been a common practice for many years. These additives fluidify or plasticize the cement composition such that a more fluid composition is obtained at a given water to cement ratio or, alternatively, a lower water to cement ratio may be used to obtain a composition having a desired consistency. The lower water to cement ratio normally results in a higher compressive strength in the hydrated cement after setting.

The present invention is directed to the use of a new class of plasticizing additives for hydraulic cement compositions and to hydraulic cement compositions containing the inventive additives. According to this invention, it has been found that graft copolymers can be used as water reducing admixtures and superplasticizers for hydraulic cement concretes, mortars, grouts, and the like. It has also been found that certain graft copolymers can function as water reducing admixtures and superplasticizers at low dosages while providing only small increases in the setting time of the cement composition, as compared to the setting time increases imparted by known water reducing admixtures and superplasticizers at comparable levels of water reduction.

The graft copolymers of the invention are capable of functioning as water reducing admixtures or superplasticizers, depending on the nature of the copolymer and the amount added to the cement compositions. "Water reducing admixture" and "superplasticizer" are terms of art which reference the relative water-reducing ability of a material. Water reducing admixtures provide a water reduction capability of 5% to 12% (ASTM-C-494, Type A or Type D), while superplasticizers provide water reduction in excess of 12% (ASTM-C494, Type F or G). For brevity and convenience, the graft copolymers of the invention are referred to herein as plasticizers. This term includes, however, both water reducing admixtures and superplastics, as defined immediately above.

Graft copolymers, as a generic class of materials, are well known in the chemical art. These polymers are comprised of a base or "backbone" polymer chain to which side chain polymers are attached at various points. The side chain polymer has a different chemical structure than the backbone polymer, i.e., comprises different monomers or a different combination of monomers. The graft copolymer plasticizers of this invention comprise a polyether backbone having attached side chain polymers formed by polymerization of ethylenically unsaturated monomers. The attachment of the side chain polymer provides a graft copolymer that has a greater plasticizing capability than the polyether backbone itself. As a practical matter, the requirement that the side chain enhance the plasticizing capability of the polyether will determine which ethylenically unsaturated monomers may be used to form the side chain. In general, one class of monomers which can be used to form the side chain polymers are the ethylenically unsaturated monomers which have been used previously to form plasticizing homopolymers and copolymers, and which can be grafted onto polyethers. As further discussed herein, many of the free, non-grafted polymers formed from such monomers, while providing a desired level of plasticization, also result in undesirable increases in the setting time of the cement composition, or have other undesirable performance characteristics. According to this invention, use of polymeric units formed from such monomers as grafted side chains may serve to minimize such undesirable performance, while still yielding a polymeric product providing the desired level of plasticization.

As used herein, "polyether" means any homopolymer or copolymer which is capable of undergoing grafting with ethylenically unsaturated monomers and has repeating units containing the carbon-oxygen ether linkage. The polyethers thus have repeating units of the formula $-(O-R)-$ wherein R is an organic moiety containing a carbon atom linked to the oxygen through a single covalent bond. The polyether may contain two or more different repeating units containing different R moieties. One or more of the repeating ether units may contain one or more carbon atoms which can function as grafting sites, e.g., by undergoing hydrogen or halogen abstraction. In general, the provision of grafting sites in the R moiety is preferred, although such sites may additionally or alternatively be provided by other groups or atoms which may be present in the polyether.

R may be an arylene group, e.g., phenylene, provided that other groups or moieties are present in the polymer which provide grafting sites; a divalent alkylaryl group wherein one of the alkyl carbon atoms is linked to the oxygen, e.g.,

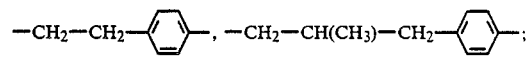

a saturated cyclic group, e.g., cyclohexylene; or a saturated or unsaturated, substituted or unsubstituted aliphatic group. Saturated aliphatic groups are preferred, particularly alkylene groups such as ethylene, propylene, butylene, isopropylene, or isobutylene. The preferred polyethers for use in the invention are accordingly polyoxyalkylene, e.g., polyoxyethylene homopolymers, polyoxypropylene homopolymers, and oxypropylene/oxyethylene copolymers. Polyoxyalkylenes are well known and a variety of such polymers are commercially available. Commercial polyoxyalkylenes which may be used in this invention include those sold under the Pluracol, Tetronic, and Pluronic tradenames by BASF Wyandotte Corporation and under the Jeffamine and Thanol tradenames by Texaco Inc. The polyethers may include reactive groups, e.g., amino, carboxyl, or hydroxyl groups, positioned at the end of the polymer or at intermediate points along the polymer chain. If desired, these groups may be derivatized before or after grafting of the side chain. Preferred polyoxyalkylenes, for example, include terminal hydroxyl groups arising from polymerization of the corresponding alkylene oxide. These hydroxyl groups may remain unreacted or may be derivatized before or after grafting of the side chain to provide, for example, urethane or ester derivatives.

The molecular weight of the polyether backbone is preferably within the range of about 200 to 30,000, and more preferably is in the range of about 500 to 10,000.

As is generally the case with cement water reducing admixtures and superplasticizers, the graft copolymers of this invention should be water dispersible or water soluble. Thus, the graft copolymer should be dispersible or soluble in a 100% water medium or an aqueous medium comprised principally of water, e.g., an aqueous alcohol medium containing a minor percentage of alcohol. The pH of the medium may be adjusted as necessary to obtain or optimize dispersibility or solubility.

Where the polyether backbone is a relatively hydrophobic material, such that it has low water dispersibility or solubility, an appropriate side chain which imparts the desired solubility or dispersibility is grafted to the polyether. Side chains used for this purpose should accordingly be more hydrophilic than the polyether backbone. Preferred side chains, from the standpoint of promoting water dispersibility and solubility, are those which contain salt-forming groups. The salt-forming groups may be provided by homopolymerizing or copolymerizing ethylenically unsaturated monomers containing an acid group, such as acrylic acid, methacrylic acid, or 2-sulfoethylmethacrylate, to form the side chain. Alternatively, monomers may be used which contain precursors which can be reacted after graft polymerization to provide a salt-forming group, e.g., maleic anhydride may be incorporated into the side chain and subsequently hydrolyzed to the acid form. In general, the acid group is converted after grafting to its salt form by neutralization with a base. The salt-forming groups may also be provided by monomers containing a quaternary ammoniumgroup or an amine group which can be quaternized after polymerization.

The ethylenically unsaturated monomers used in the invention are polymerizable monomers characterized by the presence therein of at least one polymerizable ethylenic unsaturated group of the structure $>C=C<$. Any such monomer which can be grafted onto a polyether to provide a graft copolymer having a greater plasticizing capability than the polyether, and which permits water dispersibility or solubility of the graft copolymer, can be used in this invention. The monomers can be used singly or in combination to produce homopolymer or copolymer side chains. Examples of ethylenically unsaturated monomers which can be used are the $\alpha,\beta$-ethylenically unsaturated acids, e.g., acrylic acid, methacrylic acid, and itaconic acid; the $\alpha, \beta$-ethylenically unsaturated acid esters, e.g., methyl acrylate, methylmethacrylate, ethylacrylate, 2-hydroxypropylacrylate, 2-hydroxypropylmethacrylate, 2-hydroxyethylmethacrylate, 2-hydroxyethylacrylate, 2-sulfoethylmethacrylate, 3-sulfopropylethacrylate, bis-(3-sulfopropyl)itaconate, 2-phenoxyethylacrylate, tetrahydrofurfurylacrylate, cyclohexylmethacrylate, polyethylene glycol monomethacrylate, polypropylene glycol monoacrylate, and caprolactone acrylate monomers such as Tone M-100 monomer of Union Carbide Corp.; the $\alpha,\beta$-ethylenically unsaturated acid amides, e.g., acrylamide, methacrylamide, diacetone-acrylamide, dimethylaminopropylmethacrylamide, and 2-acrylamido-2-methylpropane sulfonic acid; ethylenically unsaturated acids and acid esters of the formula (I)

wherein $R_1$, $R_2$, $R_3$, and $R_4$ are each independently hydrogen or alkyl and n is 1 to 20; vinyl esters such as vinyl acetate; vinyl ethers; vinyl ketones; vinyl aromatic monomers such as styrene and styrene sulfonic acid; N-vinylpyrrolidone; polymerizable acid anhydrides such as maleic anhydride and itaconic anhydride; aminoalkylacrylate and methacrylates, e.g., dimethylaminoethyl acrylate and diethylaminoethyl methacrylate; betaines such as N-(3-sulfopropyl)-N-methacryloxyethyl-N,N-dimethylammonium betaine and 1-(3-sulfopropyl)-2-vinyl pyridinium betaine; and cationic quaternary ammonium monomers such as the quaternized aminoalkyl acrylates and methacrylates. The $\alpha,\beta$-ethylenically unsaturated acids are preferred monomers for use in this invention.

It should be understood that, depending on the nature of the monomer, single monomeric units may become grafted onto the polyether backbone. In particular, monomers conforming to the above formula (I) may graft in this manner. Accordingly, as used herein, the term "side chain" and "side chain polymer" broadly include and refer to grafted moieties comprised of a single monomeric unit. Similarly, reference herein to the polymerization of ethylenically unsaturated monomers broadly includes the grafting of single monomeric units onto the polyether backbone.

A generally useful amount of monomer or mixture of monomers for preparing the side chain polymers is within the range of about 5% to 50% by weight, based on the combined weight of the monomer(s) and polyether. Normally, it is preferred to use an amount of monomer which, on average for a number of different cements, provides a high degree of plasticization, balanced by minimization of any undesired effects which might occur in the hydraulic cement composition. In addition, the amount of monomer may depend on obtaining a desired water dispersibility or solubility, e.g., it may be necessary to use a greater amount of hydrophilic monomer with a relatively hydrophobic polyether backbone.

Particularly preferred copolymers of this invention are those comprising a hydroxyl terminated polyoxyalkylene backbone, most preferably a hydroxyl terminated oxyethylene/oxypropylene copolymer, and side chains comprising a homopolymer or copolymer of acrylic acid. The amount of acrylic acid used in preparing the side chains is preferably in the range of about 10% to 35% by weight, based on the combined weight of the polyether and acrylic acid, with a more preferred range being about 15% to 25%. These graft copolymers have been found to function effectively as superplasticizers at low dosages in the range of 0.05% to 0.4% by weight, based on the weight of cement solids, with relatively small accompanying increases in set retardation and good compressive strengths being obtained.

It should be recognized that the present invention brings to the art the practic of introducing functional polymeric materials into hydraulic cement compositions as grafted side chains. This practice may permit a more advantageous use of certain types of polymeric materials which, as free, non-grafted polymers, are normally not suitable or of limited utility in such compositions. Polyacrylic acid polymers, for example, are known to be superplasticizers but are of limited utility in hydraulic cement compositions which must set relatively quickly because they impart excessive set retardation. In this invention, however, a polyacrylic acid can be used as a grafted side chain, providing graft copolymers which are comparable superplasticizers but impart comparatively less set retardation than free polyacrylic acid polymers, at an equivalent slump. Thus, for example, a polyacrylic acid homopolymer and a graft copolymer composition of the invention containing a graft copolymer having polyacrylic acid side chains may be used in amounts which provide equivalent slumps in hydraulic cement concretes but, in general, the concrete containing the graft copolymer composition will have a substantially lower setting time.

The graft copolymers of this invention are prepared by free radical addition polymerization of an ethylenically unsaturated monomer or a mixture of such monomers in the presence of a polyether. Although the radical form of the monomer may be generated thermally, it is usually preferred to include a free radical initiator in the reaction mixture. The polymerization may be accomplished by procedures known in the art, e.g., emulsion or suspension polymerization, bulk polymerization, or solution polymerization. Generally, it is preferred to employ bulk polymerization when the monomer is miscible with the polyether. However, if necessary, an organic solvent or diluent which does not participate in the polymerization reaction may be used.

In addition to the graft copolymer which is formed, the reaction product of the free radical polymerization will generally also contain one or more by-product constituent materials, e.g., non-grafted addition homopolymers of the monomer (or copolymer where a mixture of monomers is used), and polyether degradation products. The reaction product mixture may also contain unreacted polyether. These reaction product mixtures may be used as admixtures of this invention without purification or segregation of the species therein. Accordingly, reference throughout this application to graft copolymers is intended to refer also to these reaction product mixtures.

It should be understood that it is very difficult to analyze accurately for the extent of grafting and the degree of polymerization in the side chain, as well as the amount of graft copolymer formed in proportion to by-product polymers. These parameters will vary with the polyether and monomers used and their relative amounts, the amount and type of initiator, the rate of mixing of the reagents, and reaction temperatures and times. As indicated above, a generally useful amount of monomer for forming the side chains is about 5% to 50% by weight, based on the combined weight of monomer and polyether. About 10% to 35% by weight, similarly based, is a preferred amount. It will be appreciated that the percentage by weight of the side chains in the graft copolymer will be less than the percentage amount of monomer charged to the reactor, since part of the monomer charge is consumed in the formation of byproducts, such as non-grafted addition polymers. The above given weight percentages of monomers, for example, are believed to provide graft copolymers containing, respectively, about 2% to 40%, and preferably about 5% to 30%, by weight of grafted side chains. These are approximate amounts, however, as a consequence of the indeterminate partial conversion of monomer to side chain and the difficulty in analyzing the reaction product.

The addition polymerization reaction generally may be conducted at a temperature in the range of about 100° C. to 180° C. A more preferred range is about 130° to 160° C. The reaction time can vary over a wide range depending on such factors as polymerization method, reagent and initiator concentrations, and reaction temperature. For example, in bulk polymerizations at a reaction temperature of 130° C. to 160° C., a reaction time of two to six hours is generally sufficient to deplete all of the monomer charge. In a preferred method of preparation, bulk preparation is employed with a reaction temperature of about 130° C. to 160° C., with gradual addition of at least part of the monomer, e.g., with continuous monomer addition over a one to two hour period. The reaction mixture is maintained at the reaction temperature for about one hour after all of the monomer is added.

At the end of the reaction period, the reaction mixture is worked up as necessary to provide a desired admixture product. The work up normally involves simply adding water or a desired aqueous medium to the reaction mixture to provide a desired solids concentration, followed by pH adjustment. If an organic solvent or diluent is used during the polymerization it is normally removed prior to the addition of water or the aqueous medium.

The pH is normally adjusted to provide optimum solubility or dispersibility of the graft copolymer. Where salt forming acid groups are present on the polymer, for example, the pH is usually brought to a level above the $pK_a$ of the acid so as to form ionic species.

Free radical initiators which may be used to promote the polymerization reaction include the conventional peroxy and azo initiators. Exemplary initiators are di-tert-butyl peroxide, benzoyl peroxide, lauroyl peroxide, oleyl peroxide, tolyl peroxide, di-tert-butyl diperphthalate, tert-butyl peracetate, tert-butyl perbenzoate, dicumyl peroxide, 2,5-dimethyl-2,5-di(tert-butylperoxy)-hexyne-3, tert-butyl hydroperoxide, cumene hydroperoxide, hydroperoxide, cyclopentane hydroperoxide, diisopropylbenzene hydroperoxide, p-tert-butyl cumene hydroperoxide, 2,5-dimethylhexane-2,5 dihydroperoxide, etc., and mixtures thereof. The initiator, when included, is generally in the range of 0.001 to 5.0 percent and preferably on the order of 0.05 to 2.5 percent by weight of the polyether and side chain forming monomers.

It is usually desirable to degas the reaction mixture for a sufficient period of time to remove oxygen from the reaction zone since oxygen inhibits the polymerization reaction. The degassing can be conveniently accomplished by blowing nitrogen gas through the reactor prior to the polymerization. It is also usually desirable to conduct the polymerization under a continuous nitrogen blanket.

As mentioned previously, the present invention is directed in part to hydraulic cement compositions containing the graft copolymers described above. These compositions comprise a hydraulic cement and a graft copolymer. The term "hydraulic cement" is used herein in its ordinary and well accepted sense, and thus refers to any cement which, when made into a paste with water, sets and hardens as a result of chemical reactions between the water and cement. Portland cement is the most familiar example of a hydraulic cement and is the preferred material for use in the cement compositions of the invention. Other hydraulic cements which may be used include aluminous, oil well, slag, pozzolanic, and silicate cements, as well as gypsum and magnesium oxychloride based materials.

The hydraulic cement composition may be in a dry powder form or mixed with water to form a plastic mix. It is generally preferred to add the graft copolymer to the cement in connection with preparation of an aqueous hydraulic cement mix i.e., with the mix water or as an additive to the already formed mix composition. The graft copolymer may, however, be added at an earlier stage, such as during the grinding of clinker to prepare the cement.

The graft copolymer is preferably added to the cement in the form of an aqueous solution or dispersion. Generally, the amount of graft copolymer added is in the range of about 0.01% to 0.6% by weight, based on the weight of dry cement in the composition. A more preferred range is about 0.05% to 0.4%.

The hydraulic cement compositions may include other functional additives such as set accelerators and retarders, fluid loss agents, air entraining and detraining agents, and other hydraulic cement plasticizing materials. These additives may be added separately or admixed with the graft copolymer prior to addition to the cement. The compositions may also include any of the aggregate materials commonly used in the trade, e.g., sand and stone to form structural concretes and various lightweight aggregates such as vermiculite and perlite.

Cement compositions of the invention comprising an air detraining agent may be of particular interest in certain applications. Various commercially available air detraining or antifoaming agents can be employed, including tri-n-butylphosphate, 1-octanol, the General Electric antifoaming agents sold as GE AF-60 and GE AF-72, the antifoaming agents sold as Antifoam H-10, Antifoam B, and DB 100 by Dow Chemical Co., the antifoaming agents sold under the Foamaster tradename by Diamond Shamrock, and the antifoaming agents sold under the Surfynol tradename by Air Products & Chemicals Corp. The air detraining agent can be added to a solution or dispersion of the graft copolymer prior to being added to the cement composition or it may be added separately. The amount of air detraining agent which is used is normally in the range of about 0.1% to 10% by weight, based on the weight of the graft copolymer. A more preferred range is about 1% to 5% by weight. A decrease in setting time of the cement composition may be attained through use of the air detraining agent with little or no change in the plasticity imparted by the graft copolymer.

The following Examples further describe and illustrate the invention, but are not intended to limit the scope thereof. Unless otherwise indicated, all parts and proportions are by weight.

EXAMPLE 1

A graft copolymer of acrylic acid and an oxyethylene/oxypropylene copolymer was prepared by the following procedure.

A mixture of 20.0 grams of acrylic acid and 1.0 gram of tert-butyl perbenzoate was added over a one hour period to 80.0 grams of a hydroxyl terminated oxyethylene/oxypropylene copolymer sold under the tradename Pluracol-W5100N by BASF Wyandotte Corporation (average molecular weight of about 4600) at 145° C. under nitrogen. After the addition was completed the reaction mixture was maintained at 145° C. for an additional hour. The reaction mixture was then added to a mixture of 130 grams of water and 9 grams of sodium hydroxide resulting in a homogeneous solution. The solids concentration in the solution wa measured to be about 42% and the pH was about 9.0.

EXAMPLE 2

A graft copolymer solution was prepared by the procedure of Example 1 using 75.0 grams of Pluracol W5100N, 25.0 grams of acrylic acid, and 2.0 grams of tert-butyl perbenzoate.

EXAMPLE 3

A graft copolymer solution was prepared by the procedure of Example 1 using, as the polyether backbone, a hydroxyl terminated oxyethylene/oxypropylene copolymer sold by BASF Wyandotte Corp. under the tradename Pluracol W170, having an average molecular weight of about 800. Thus, 80.0 grams of Pluracol W170, 20.0 grams of acrylic acid and 1.0 gram of tert-butyl perbenzoate were reacted according to the procedure of Example 1 and the reaction product neutralized and diluted as in that Example to produce a solution with a measured solids content of about 42%.

EXAMPLE 4

A graft copolymer solution was prepared by the procedure of Example 1 using, as the polyether backbone, a hydroxyl terminated polyoxyethylene sold by Union Carbide Corp. under the tradename Carbowax 6000. Thus, 150.0 grams of Carbowax 6000, 50.0 grams of acrylic acid, and 3.0 grams of tert-butyl perbenzoate were reacted as described in Example 1 and the reaction product neutralized and diluted as in that Example to produce a solution with a measured solids content of about 42%.

EXAMPLE 5

The graft copolymer solutions prepared in Examples 1 through 4 were added to concretes prepared using a Type I Portland cement, sand aggregate, and a water to cement ratio of 0.49. The concretes were mixed for about one minute prior to addition of the copolymer solutions. A sufficient amount of solution was added to provide a graft copolymer concentration of 0.1%, based on the weight of Portland cement in the concretes. (In this and the following Examples 7, 8, and 9, the amount of graft copolymer added to the concrete is expressed as a percentage of the Portland cement in the composition. This percentage was calculated assuming that 100% of the solution solids was graft copolymer.)

A reference concrete was prepared in an identical manner, except that the addition of graft copolymer solution was omitted. The slumps of the concretes were measured in accordance with ASTM C143 at about 11 minutes into the mix cycle (10 minutes after addition of the graft copolymer). The initial setting times of the concretes were also measured, in accordance with ASTM C403. The measured results are presented in Table 1, wherein the concretes are designated numerically in correspondence with the graft copolymer solution added from the above Examples.

TABLE 1

| Concrete | Slump (in.) | Initial Setting Time (hr:min) |
| --- | --- | --- |
| Reference | 3.25 | 3:40 |
| 1 | 6.75 | 5:02 |
| 2 | 7.50 | 5:14 |
| 3 | 6.00 | 5:11 |
| 4 | 6.25 | 4:57 |

EXAMPLE 6

A graft copolymer solution was prepared by the procedure of Example 1 using, as the polyether backbone, a hydroxyl terminated polyoxypropylene sold by BASF Wyandotte Corp. under the tradename Pluracol P 4010, having an average molecular weight of about 4000. Thus, 170.0 grams of Pluracol P 4010, 30.0 grams of acrylic acid, and 1.0 gram of tert-butyl perbenzoate were reacted according to the procedure of Example 1 to prepare a solution with a measured solids content of about 42%.

EXAMPLE 7

The graft copolymer solution of Example 6 was added to a concrete prepared using the Type I Portland cement of Example 5, sand aggregate, and a water to cement ratio of 0.49. A sufficient amount of the solution was added to provide a graft copolymer concentration 0.10%. The time of addition was as in Example 5 and slump and setting time measurements were then made, also as in Example 5, and compared with a reference concrete containing no graft copolymer solution. The slump and setting time of the reference concrete were 3.5 inches and 4:11 while the concrete containing the graft copolymer solution had a measured slump of 6.1 inches and a setting time of 4:49.

EXAMPLE 8

To 81 grams of a 42% solids solution of a graft copolymer of acrylic acid and Pluracol W5100N, prepared according to the procedure of Example 1, was added 0.35 gram of tri-n-butyl phosphate (TNBP). Similarly, 0.35 gram of Surfonyl 440 air entraining agent of Air Products & Chemicals Corp. was added to 81 grams of the graft copolymer solution. The resultant solutions were added to concretes prepared using a Type I Portland cement, sand aggregate, and a water to cement ratio of 0.81. The cement factor was 400 lbs./yd. The amount of a solution added provided a concentration of graft copolymer of 0.2%. The solutions were added, and slump and setting times measured, as in Example 5. The compressive strengths were also measured, in accordance with the procedure of ASTM C192. For comparison, two concretes were prepared similarly except that in one concrete the graft copolymer solution alone was added and in the second concrete neither the graft copolymer solution nor an air detraining agent was added. The measured results are presented in Table 2.

that of a control sample which was prepared without addition of the graft copolymer solution and W/C of 0.50. The control thus provided the basis for determining the degree of water reduction and strength improvement. The measured results are presented in Table 3.

TABLE 3

| Graft Copolymer Concentration | W/C | Slump (in.) | Initial Setting Time (hr:min) | 28 Day Compressive Strength (psi) |
|---|---|---|---|---|
| Control | 0.50 | 2.6 | 3:59 | 6358 |
| 0.125 | 0.47 | 3.2 | 4:15 | 6764 |
| 0.20 | 0.45 | 3.0 | 4:19 | 7551 |
| 0.30 | 0.42 | 2.6 | 4:41 | 7811 |
| 0.50 | 0.40 | 2.9 | 4:58 | 8301 |

The results illustrate the substantial water reducing capability of the inventive admixture (up to 20% at the higher dosages) with substantial accompanying increases in compressive strength. Relatively minimal setting time increases were also observed.

What is claimed is:

1. A composition comprising a hydraulic cement and a graft copolymer plasticizer, said graft copolymer plasticizer comprising a polyether backbone polymer having an average molecular weight of about 200 to 30,000 and side chain polymers prepared by polymerization of an ethylenically unsaturated monomer, said graft copolymer plasticizer containing about 2% to 40% by weight of said side chain polymers.

2. A composition of claim 1 comprising about 0.01% to 0.6% by weight of said graft copolymer, based on the weight of said hydraulic cement.

3. A composition of claim 1 comprising about 0.05% to 0.4% by weight of said graft copolymer, based on the weight of said hydraulic cement.

4. A composition of claim 1 wherein said backbone polymer comprises a polyoxyalkylene.

5. A composition of claim 4 wherein said polyoxyalkylene is a polyoxyethylene, polyoxypropylene, or an oxyethylene/oxypropylene copolymer.

6. A composition of claim 4 wherein said polyoxyalkylene comprises terminal hydroxyl groups.

TABLE 2

| Concrete Admixture | | | | Initial | Compressive Strength (PSI) | | |
|---|---|---|---|---|---|---|---|
| Graft Copolymer Conc. | Air Detraining Agent | Slump (in.) | % Air | Setting Time (hr:min) | 1 day | 7 day | 28 day |
| — | — | 2.5 | 2.5 | 4:34 | 719 | 1610 | 3033 |
| 0.2 | — | 7.50 | 6.2 | 6:10 | 643 | 1752 | 2532 |
| 0.2 | TNBP | 7.25 | 3.8 | 5:34 | 675 | 1887 | 2827 |
| 0.2 | Surfonyl 440 | 7.00 | 3.9 | 5:30 | 705 | 1765 | 2627 |

The results presented in Table 2 illustrate that air detraining agents can be used to reduce setting time and increase compressive strength without significantly altering the slump increase caused by the graft copolymer.

EXAMPLE 9

To evaluate the water reducing capability of the graft copolymer solution of Example 1 and the effect of water reduction on compressive strength, the solution was added in different amounts to batches of a concrete prepared using a Type I Portland cement and a cement factor of 611 lbs./yd. The water to cement ratio (W/C) was adjusted in each case to provide approximately equivalent slumps which, in turn, were about equal to 7. A composition of claim 1 wherein said graft copolymer contains about 5% to 30% by weight of said side chain polymers.

8. A composition of claim 1 wherein said monomer is selected from the group consisting of $\alpha,\beta$-ethylenically unsaturated acids, $\alpha,\beta$-ethylenically unsaturated acid esters; $\alpha,\beta$-ethylenically unsaturated acid amides; ethylenically unsaturated acids and acid esters of the formula

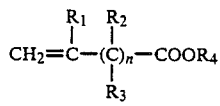

wherein $R_1$, $R_2$, $R_3$, and $R_4$ are each independently hydrogen or alkyl and n is 1 to 20; vinyl esters; vinyl ethers; vinyl ketones; vinyl aromatic monomers; N-vinylpyrrolidone; polymerizable acid anhydrides; aminoalkyl acrylates and methacrylates; ethylenically unsaturated betaines; and cationic quaternary ammonium monomers.

9. A composition of claim 1 wherein said monomer is an $\alpha,\beta$-ethylenically unsaturated acid.

10. A composition of claim 1 wherein said monomer is acrylic acid.

11. A composition of claim 10 wherein said backbone polymer is a hydroxyl terminated polyoxyalkylene.

12. A composition of claim 11 wherein said backbone polymer comprises an oxyethylene/oxypropylene copolymer.

13. A composition of claim 11 wherein said graft copolymer contains about 5% to 30% by weight of said side chain polymers.

14. A composition of claim 1 further comprising an air detraining agent.

15. A composition of claim 14 comprising about 0.1% to 10% of said air detraining agent, based on the weight of said graft copolymer.

16. A composition of claim 1 wherein said hydraulic cement is Portland cement.

17. A composition comprising a hydraulic cement and a plasticizer, said plasticizer being a reaction product formed by a free radical polymerization of an ethylenically unsaturated monomer or mixture of such monomers in the presence of a polyether having an average molecular weight of about 200 to 30,000, the amount of said monomer or mixture of monomers being about 5% to 50% of the combined weight of said polyether and said monomer or mixture of monomers.

18. A composition of claim 17 comprisng about 0.01% to 0.6% by weight of said reaction product, based on the weight of said hydraulic cement.

19. A composition of claim 17 comprising about 0.05% to 0.4% by weight of said reaction product, based on the weight of said hydraulic cement.

20. A composition of claim 17 wherein said polyether comprises a polyoxyalkylene.

21. A composition of claim 20 wherein said polyalkylene is a polyoxyethylene, polyoxypropylene, or an oxyethylene/oxypropylene copolymer.

22. A composition of claim 20 wherein said polyoxyethylene comprises terminal hydroxyl groups.

23. A composition of claim 17 wherein the amount of said monomer or mixture of monomers is about 10% to 35% of the combined weight of said monomer or mixture of monomers and said polyether.

24. A composition of claim 17 wherein said monomer is selected from the group consisting of $\alpha,\beta$-ethylenically unsaturated acids; $\alpha,\beta$-ethylenically unsaturated acid esters; $\alpha,\beta$-ethylenically unsaturated acid amides; ethylenically unsaturated acids and acid esters of the formula

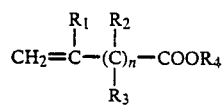

wherein $R_1$, $R_2$, $R_3$, and $R_4$ are each independently hydrogen or alkyl and n is 1 to 20; vinyl esters; vinyl ethers; vinyl ketones; vinyl aromatic monomers; N-vinylpyrrolidone; polymerizable acid anhydrides; aminoalkyl acrylates and methacrylates; ethylenically unsaturated betaines; and cationic quaternary ammonium monomers.

25. A composition of claim 17 wherein said monomer is an $\alpha,\beta$-ethylenically unsaturated acid.

26. A composition of claim 17 wherein said monomer is acrylic acid.

27. A composition of claim 25 wherein said polyether is a hydroxyl terminated polyoxyalkylene.

28. A composition of claim 27 wherein said polyether comprises an oxyethylene/oxypropylene copolymer.

29. A composition of claim 17 further comprising an air detraining agent.

30. A composition of claim 17 wherein said hydraulic cement is Portland cement.

31. A composition of claim 17 wherein said polymerization is conducted in the presence of a free radical initiator.

32. A composition of claim 31 wherein said polymerization is conducted at a reaction temperature of 100° C. to 180° C.

33. A composition of claim 32 wherein said polymerization is a bulk polymerization conducted at a reaction temperature of 130° C. to 160° C.

* * * * *